United States Patent [19]

Shinnai

[11] Patent Number: 5,579,460
[45] Date of Patent: Nov. 26, 1996

[54] PAINT-OUT METHOD AND APPARATUS

[75] Inventor: Hiroshi Shinnai, Yamaguchi, Japan

[73] Assignee: Fuji Xerox Co., Ltd., Tokyo, Japan

[21] Appl. No.: 494,004

[22] Filed: Jun. 23, 1995

Related U.S. Application Data

[63] Continuation of Ser. No. 269,317, Oct. 1, 1991, abandoned.

[30] Foreign Application Priority Data

Dec. 21, 1990 [JP] Japan ..................................... 2-413427

[51] Int. Cl.$^6$ .................................................. G06T 15/00
[52] U.S. Cl. ............................................ 395/137; 395/126
[58] Field of Search ................................ 395/120, 119, 395/126–132, 133, 134, 135, 141, 129, 140

[56] References Cited

U.S. PATENT DOCUMENTS 4,181,953  1/1980  Osofsky ............................. 395/141 X
5,056,045  10/1991  Ohsawa ................................. 395/141

FOREIGN PATENT DOCUMENTS 1-166181  6/1989  Japan .

OTHER PUBLICATIONS

*Computer Graphics*, Foley et al., (2d ed. Addison–Wesley Publishing Co. 1990), pp. 73–74, 92–99.

Primary Examiner—Almis R. Jankus
Attorney, Agent, or Firm—Finnegan, Henderson, Farabow, Garrett & Dunner, L.L.P.

[57] ABSTRACT

The paint-out processing speed for the inner part of a figure is increased in the image supply unit for a printer. When a scan line is moved down to the vertex or intersection of a figure, which is expressed in the form of contour data, graphic lines present between the vertex or intersection and the next vertex or intersection are sorted in the scan direction, to form a sorting list. A fill list for designating a paint-out segment is formed on the basis of the sorting list. The paint-out processing is performed according to the fill list. The sorting is required only for the vertex or intersection, while the conventional paint-out method requires the sorting every scan line. The sorting time is reduced and the paint-out processing speed is increased.

11 Claims, 8 Drawing Sheets

| A ($X_A$, $Y_A$) |
| C ($X_C$, $Y_C$) |
| D ($X_D$, $Y_D$) |
| E ($X_E$, $Y_E$) |
| B ($X_B$, $Y_B$) |

FIG. 4A

| LINE NO. | 40 |
|---|---|
| START POINT | A(X$_A$, Y$_A$) |
| END POINT | B(X$_B$, Y$_B$) |
| dx = 1/INCLINATION | $\frac{\Delta X1}{\Delta Y1}$ |
| X COORDINATE VALUE ON THE PRESENT SCAN LINE | Xn |

FIG. 4B

| LINE NO. | 40 |
|---|---|
| START POINT | A(X$_A$, Y$_A$) |
| END POINT | B(X$_B$, Y$_B$) |
| dx = 1/INCLINATION | $\frac{\Delta X1}{\Delta Y1}$ |
| X COORDINATE VALUE ON THE PRESENT SCAN LINE | Xn |
| VECTOR VALUE | -1 |

FIG. 5

| P |
|---|
| GRAPHIC LINE 44 (EA) |
| GRAPHIC LINE 42 (CD) |
| Q |
| GRAPHIC LINE 40 (AB) |
| GRAPHIC LINE 42 (CD) |
| T |
| GRAPHIC LINE 44 (EA) |
| GRAPHIC LINE 41 (BC) |

| GRAPHIC LINE 44 (EA) |
| GRAPHIC LINE 40 (AB) |

VERTEX A

| GRAPHIC LINE 41 (BC) |
| GRAPHIC LINE 42 (CD) |
| GRAPHIC LINE 44 (EA) |
| GRAPHIC LINE 40 (AB) |

VERTEX C

| GRAPHIC LINE 41 (BC) |
| GRAPHIC LINE 44 (EA) |
| GRAPHIC LINE 42 (CD) |
| GRAPHIC LINE 40 (AB) |

INTERSECTION P

FIG. 8A

VERTEX A

| LEFT END OF THE PAINT-OUT SEGMENT | RIGHT END OF THE PAINT-OUT SEGMENT |
|---|---|
| GRAPHIC LINE 44 (EA) | GRAPHIC LINE 40 (AB) |

FIG. 8B

VERTEX C

| LEFT END OF THE PAINT-OUT SEGMENT | RIGHT END OF THE PAINT-OUT SEGMENT |
|---|---|
| GRAPHIC LINE 41 (BC) | GRAPHIC LINE 42 (CD) |
| GRAPHIC LINE 44 (EA) | GRAPHIC LINE 40 (AB) |

FIG. 8C

INTERSECTION P

| LEFT END OF THE PAINT-OUT SEGMENT | RIGHT END OF THE PAINT-OUT SEGMENT |
|---|---|
| GRAPHIC LINE 41 (BC) | GRAPHIC LINE 44 (EA) |
| GRAPHIC LINE 42 (CD) | GRAPHIC LINE 40 (AB) |

FIG. 9

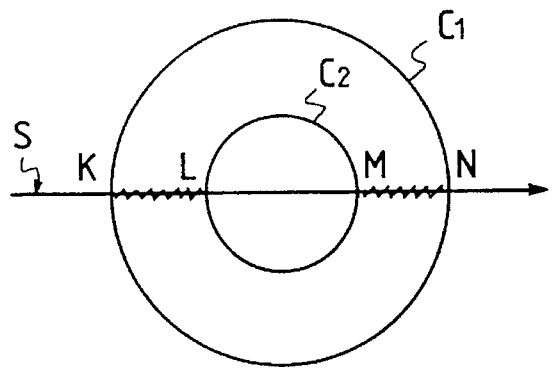

FIG. 10A

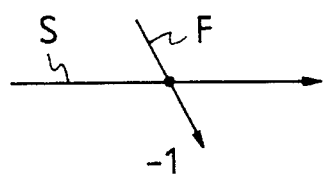

FIG. 10B

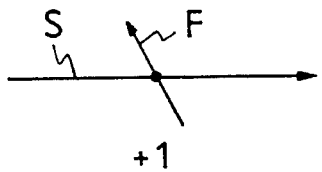

PAINT-OUT METHOD AND APPARATUS

This application is a continuation of application Ser. No. 07/769,317, filed Oct. 1, 1991, now abandoned.

BACKGROUND OF THE INVENTION

The present invention relates to a paint-out system capable of painting out the inner part of a figure at higher speed in an image supply unit such as a printer.

One type of printer includes an image supply unit which depicts an image of characters and figures of one page in a bit map memory, and supplies the image to a printing unit. A laser printer may be typically enumerated for this type of printer.

FIG. 13 is a block diagram showing a laser printer with such an image supply unit. In FIG. 13, reference numeral 1 designates a laser printer; 2, a panel; 3, a host computer terminal; 4, a LAN terminal; 5, a power source terminal; 6, an image supply unit; 7, a printing unit; 8, a power source circuit; 9, a print media; and 10 to 14, signal lines.

A host computer (not shown), connected to the host computer terminal 3, transmits print data through the signal line 10 to the image supply unit 6. The laser printer 1 may be connected to a LAN (local area network), not the host computer. In this case, the print data is applied through the LAN terminal 4 to the image supply unit 6.

An operator may enter various instructions to the laser printer 1 from the panel 2. These instructions are instructions of enlargement and reduction, for example. Instructions and responses thereto between the panel 2 and the image supply unit 6 are transferred through the signal line 11.

Image data of one page formed by the image supply unit 6, which will subsequently be described in detail, is transferred through the signal line 12 to the printing unit 7. In the printing unit 7, a laser beam is modulated in accordance with the content of an image signal output from the image supply unit 6. The modulated image beam is scanned across a photoreceptor drum, to form a latent image thereon.

During the operation of the printing unit 7, various signals are transferred between the printing unit 7 and the image supply unit 6, through the signal lines 13 and 14. Those signals are, for example, a synchronizing pulse signal transferred from the printing unit 7 to the image supply unit 6, and an operation command signal transferred from the image supply unit 6 to the printing unit 7.

Finally, the latent image on the photoreceptor is transferred to the print media 9, to complete the printing operation.

FIG. 14 is a block diagram showing the image supply unit 6. In FIG. 14, reference numeral 20 designates a host I/F (interface); 21, a panel I/F; 22, a CPU bus; 23, a bit map memory; 24, a bit map controller; 25, a printing unit I/F; 26, a CPU (central processing unit); 27, a PTC (programmable timer counter); 28, a RAM (random access memory); 29, a program memory; 30, a character pattern memory; 31, a removable memory unit having a program memory 31-1 and a character pattern memory 31-2.

The program memory 29 stores a program for operating the CPU 26. The character pattern memory 30 stores font data.

The removable memory set 31 including the program memory 31-1 and the character pattern memory 31-2 is used when the capacity of the program memory 29 or the character pattern memory 30 are short of the memory capacity.

The RAM 28, providing a memory area for work, stores various types of data necessary for the operation of the CPU 26 and the data receiving through the host I/F 20 and the panel I/F 21.

The bit map memory 23 provides a memory area where print image is developed in the form of a bit map. Usually, a bit map memory having a capacity for one page is used to constitute the print image of one page therein.

The PTC 27 is used for counting time and generating timing pulses, for example.

In forming an image in the bit map memory 23, the inner part of a graphic line is sometimes painted out. The paint-out rules are, for example, an odd/even rule and a non-zero winding number rule.

FIG. 9 is an explanatory diagram for explaining the odd/even rule. In the figure, C1 and C2 are circles; S, a scan line; and K, L, M, and N, intersections of the circles C1 and C2 and the scan line S. Curvilinear lines of the circles C1 and C2 are called graphic lines.

The odd/even rule is a rule in which of the segments formed when the scan line S intersects the graphic lines, the odd-numbered segments are painted out, but the even-numbered segments are not painted out. In this instance, the segment KL as the first segment and the segment MN as the third segment are painted out (shaded portions). If the scan line is traced from top to bottom, the accumulated area between the circles C1 and C2 is painted out.

The non-zero winding number rule will be described. The vector values in the non-zero winding number rule will be described with reference to FIG. 10. F indicates a part of the graphic line. In this rule, the direction of drawing a graphic line is also considered. A vector value "−1" is assigned to the graphic line F downwardly crossing the scan line S, as shown in FIG. 10A. Contrary, a vector value "+1" is assigned to the graphic line upwardly crossing the scan line as shown in FIG. 10B.

FIGS. 11A and 11B are explanatory diagrams for explaining how to paint out a figure according to the non-zero winding number rule. In this rule, the vector value is successively added every intersection in the direction of tracing the scan line S. The segment of which the sum of the vector values is not zero, i.e., non-zero, is painted out.

In FIG. 11A, it is assumed that the graphic line of the circle C1 is drawn counterclockwise, while that of the circle C2, clockwise. The vector values at the intersections K to L of the graphic lines of the circles and the scan line S are as shown in the figure. With the initial value of the vector value being 0, the vector values are added in the direction in which the scan line S travels forward. Then, the vector values at the intersections are as follows:

Intersection K . . . 0+(−1)=−1 (non-zero)

Intersection L . . . −1+(+1)=0

Intersection M . . . 0+(−1)=−1 (non-zero)

Intersection N . . . −1+(+1)=0

According to the non-zero winding number rule, the non-zero segments between the intersections K and L and between the intersections M and N are painted out.

FIG. 11B is an explanatory diagram used for the same purposes, but the direction of drawing the graphic line C2 is reverse to that in FIG. 11A. In this instance, the segments between the intersections K and N have all the vector values of non-zero. Therefore, those segments are painted out.

FIG. 12 is an explanatory diagram showing how to paint out an image of one page by the conventional paint-out method. In the figure, capital letters A, B, C, D, and E indicate vertexes of a figure; P, Q, R, S, and T, intersections of graphic lines; $S_0$ to $S_6$, scan lines; and X and Y, the coordinate axes. Where only the coordinates of the vertexes A to E are given, and those are connected by lines consecutively, a figure is formed as shown. The scan line is vertically traced from top to bottom in successive order. The intersections of the scan lines and the graphic lines are obtained every scan line, and are arranged (sorted) in order from the smallest X coordinate value. Each rectilinear line through which the scan line passes are divided into segments by the intersections. Those segments are selectively painted out using the odd/even rule or the non-zero winding number rule.

In the conventional paint-out method, the intersections of each scan line and the graphic lines must be sorted referring to the X-coordinate values thereof. The sorting work consumes much time, impairing the processing speed.

SUMMARY OF THE INVENTION

The present invention has been made to solve the above problems. To solve the above problems, a paint-out method of the invention comprises steps of: forming a vertex table containing the vertexes of a figure arranged in order from the largest Y coordinate value; forming a line table containing attributes of graphic lines, which are formed when a scan line arrives at the vertex where a graphic line starts, and are erased when the scan line arrives at the vertex where the graphic line terminates; forming a sorting list sorting the lines corresponding to the line table which is formed when the scan line arrives at the vertex of a figure or the intersection of a graphic line; and forming a fill list for designating a paint-out segment, which is formed on the basis of the sorting list; whereby a segment extending from a vertex or an intersection to the next vertex or intersection is painted out according to the fill list.

When the scan line moves down to reach the vertex or the intersection of a figure, the graphic lines, which exist between the vertex or intersection and the next vertex or intersection, are sorted in the scan direction. A sorting list containing the graphic lines sorted is formed. A fill list for designating the paint-out segments is formed on the basis of the sorting list.

The sorting of the graphic lines is made only at the vertexes or the intersections, while in the conventional paint-out method, the sorting is needed every scan line. Therefore, the sorting time is reduced, realizing a high speed processing of paint-out.

BRIEF DESCRIPTION OF THE DRAWINGS

FIGS. 4A and 4B are examples of a line table;

FIG. 5 is a diagram showing an example of an intersection list;

FIGS. 8A to 8C are examples of fill lists;

FIG. 9 is a diagram for explaining the odd/even rule;

FIG. 10A and 10B are diagrams for explaining the vector values in the non-zero winding number rule;

DESCRIPTION OF THE PREFERRED EMBODIMENT

Figure 1:
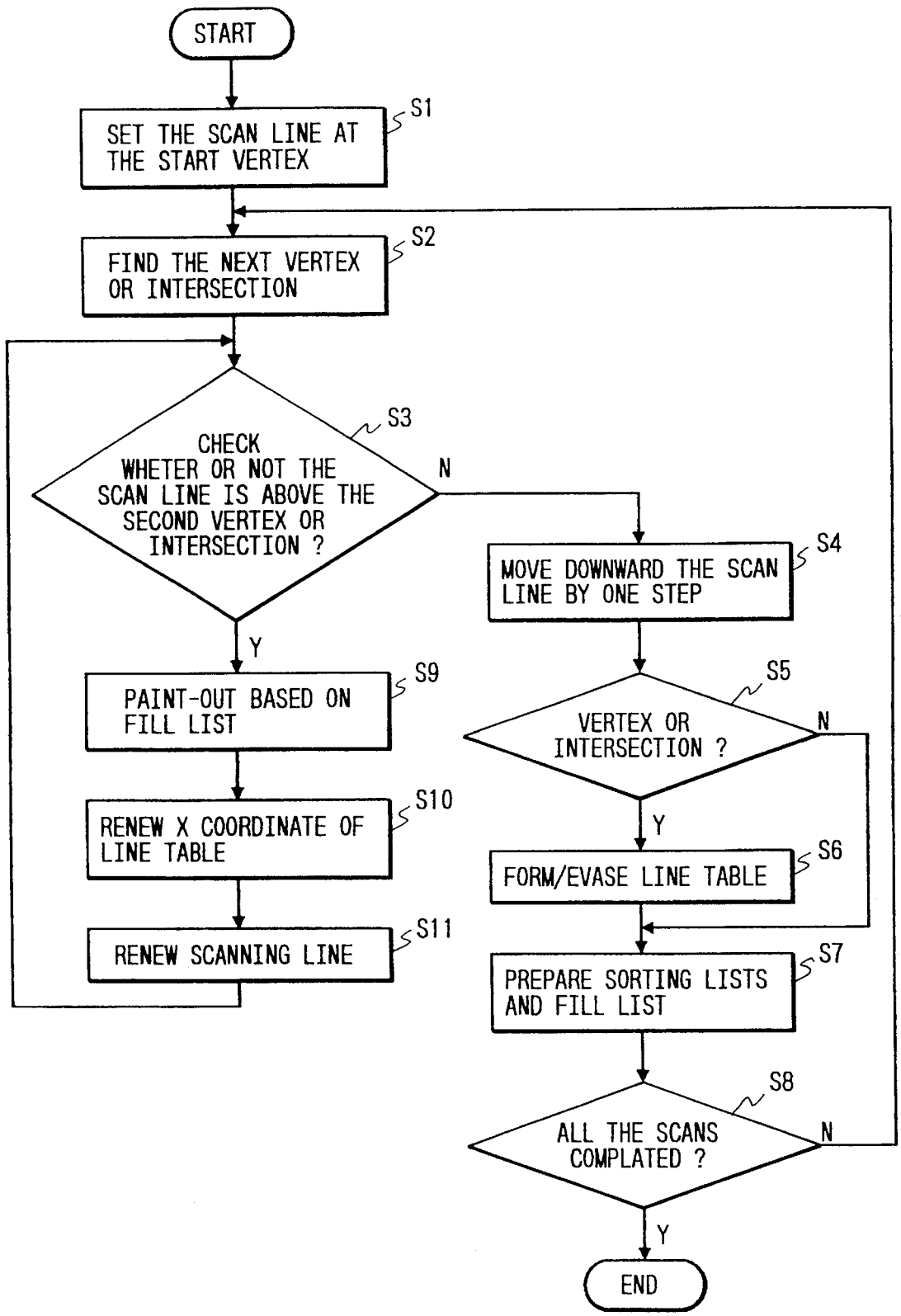
FIG. 1 is a flowchart showing a flow of a paint-out method according to the present invention.
Figures 2, 3:
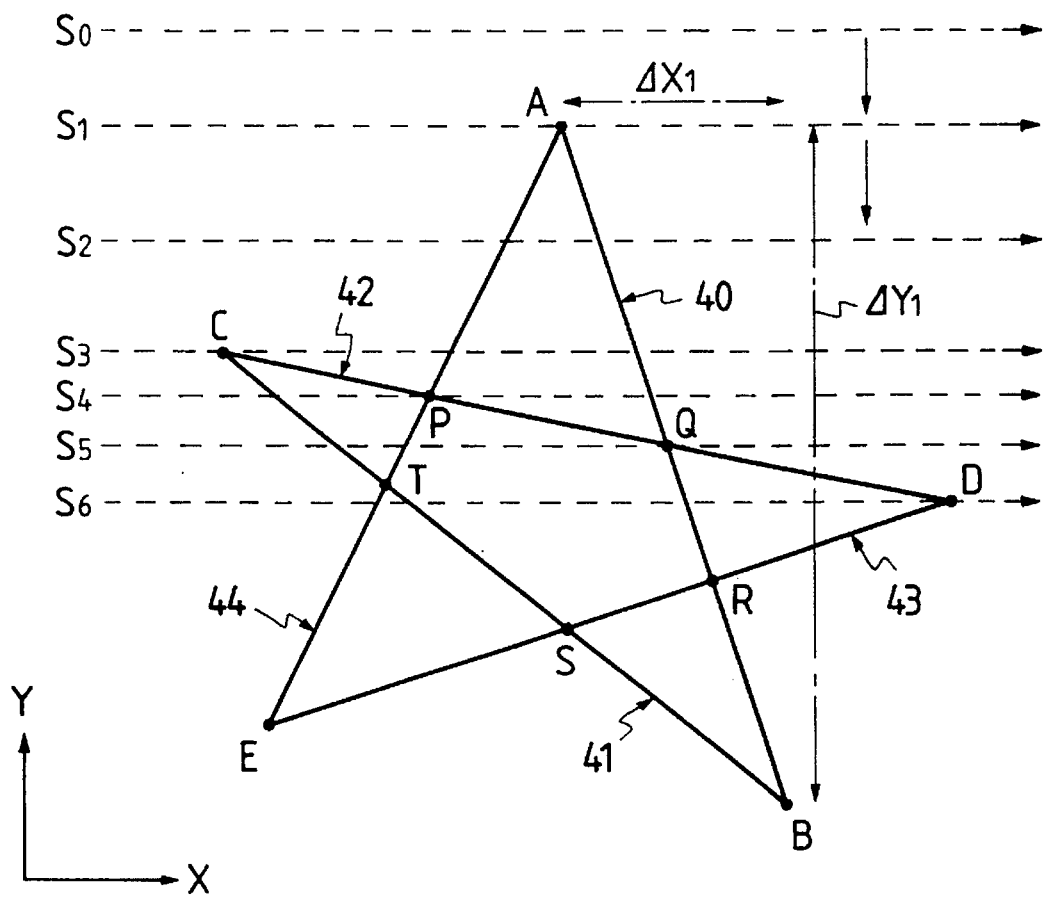
FIG. 2 is a diagram for explaining the paint-out method.
FIG. 3 is a table containing vertexes arranged in order from the largest Y coordinate value.
Figure 12:
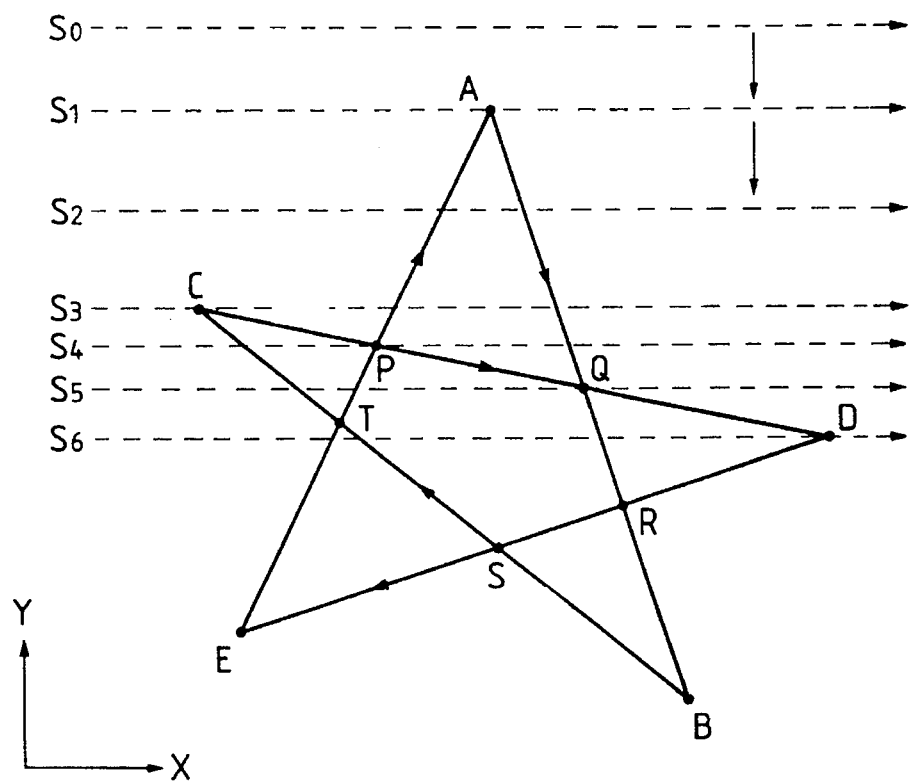
FIG. 12 is a diagram for explaining how an image of one page is painted out according to a conventional paint-out method.
Figure 13:
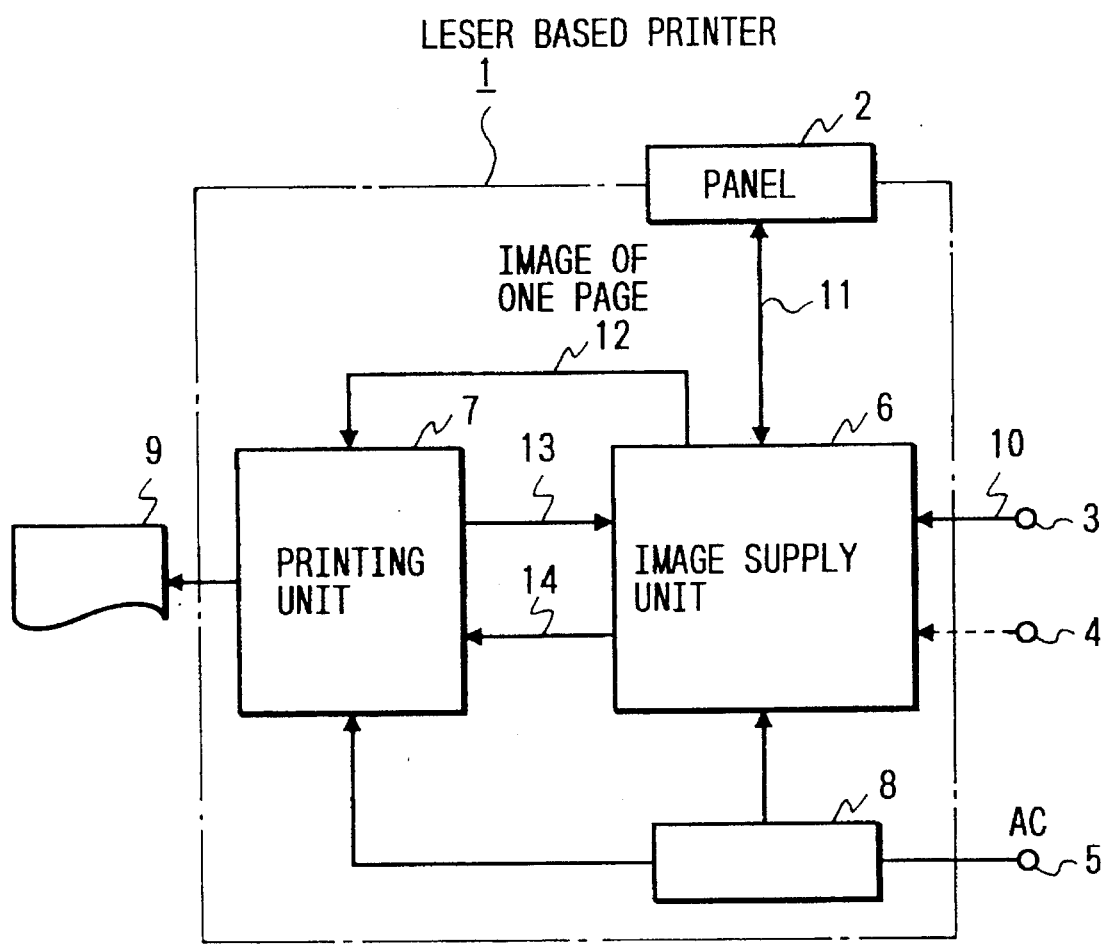
FIG. 13 is a block diagram showing a laser based printer with an image supply unit.
Figure 14:
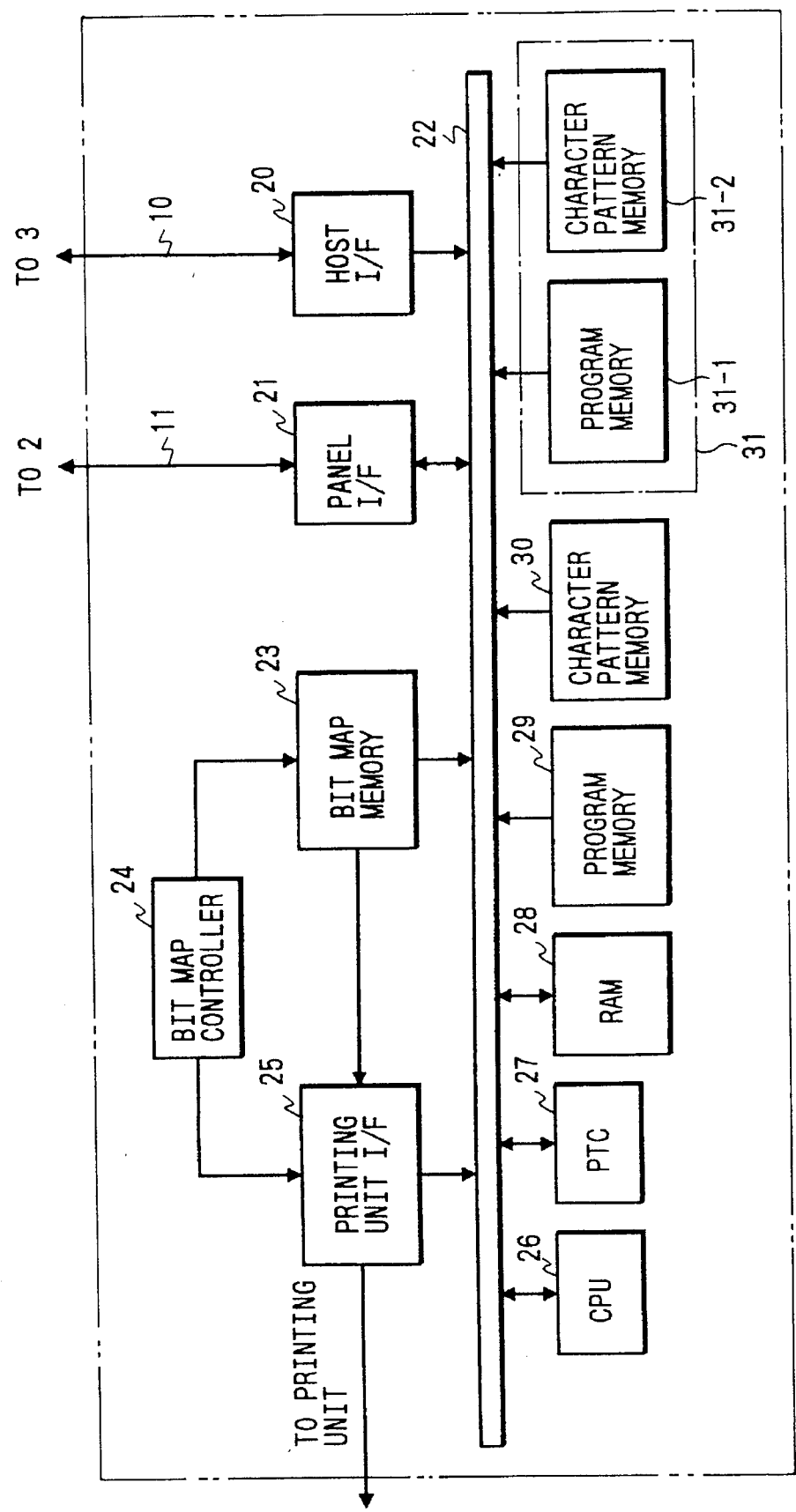
FIG. 14 is a block diagram showing an image supply unit.

A preferred embodiment of the present invention will be described in detail with reference to the accompanying drawings. FIG. 2 is an explanatory diagram useful in explaining a paint-out method according to the present invention. FIG. 1 is a flowchart showing a flow of the paint-out method. Of the reference numerals and characters in FIG. 2 corresponding to those in FIG. 12, reference numerals 40 to 44 designate graphic lines; and $\Delta X_1$ and $\Delta Y_1$ are respectively the differences between the X coordinate values at vertex B and vertex A and between the Y coordinate values.

Graphic lines 40 to 44 are formed by consecutively connecting the coordinates of the vertexes A to E.

FIG. 3 is a table containing vertexes A to E arranged in order from the largest Y coordinate value.

The scan line starts at the top vertex (the largest value of the Y coordinate), moves downward to the bottom in progressive order, and the segment defined by graphic lines is painted out according to the paint-out rule. A sequence of a process to execute the paint-out method of the preferred embodiment of the invention will be described using a flowchart of FIG. 1.

Referring to the vertex table of FIG. 3, the scan line is set to a position (Y coordinate value) from which the scan line horizontally extends to pass through a start vertex A.

(Step 1)

The next vertex or intersection is searched. Specifically, the vertex having the Y coordinate value next to that of the start vertex is searched referring to the vertex table. In this case, if the scan line is at the top vertex A, the next vertex is considered to be the vertex A. To find the next intersection, the intersection having the Y coordinate value next to that of the start vertex is searched referring to a vertex list to be given later. In this case, if the scan line is at the start vertex A, the corresponding intersection is not listed up in the intersection list. Of the vertex and the intersection thus searched, the point where the Y coordinate value is the larger of the two is selected. (Step 2)

It is checked whether or not the scan line (of which Y coordinate value) is above the second vertex or intersection searched in step 2 above. If it lies at the start vertex A, the scan line lies at the same position as the searched vertex because the searched vertex is considered to be the start vertex A (step 2). In this case, the scan line is not above the searched vertex or intersection, that is, the answer is NO, and then process goes to step 4. (Step 3)

The scan line is moved downward by one stage. (Step 4)

It is checked whether the point searched in step 2 is the vertex or the intersection. (Step 5)

If it is the vertex, a table (line table) of the graphic lines connected to the vertex is formed. (Step 6)

FIGS. 4A and 4B show examples of the line table. FIG. 4A, which tabulates the information on the graphic line 40, contains the line number "40", the coordinates of the start point A and the end point B, the reciprocal (dX) of an inclination of the graphic line 40, and the X coordinate value (Xn) on the present scan line.

The reciprocal of the inclination (dX=ΔX1/ΔY1) is used to obtain the intersection of the scan line and the graphic line when scan line is updated by one (moved downward by one step).

A line table shown in FIG. 4B is formed when the nonzero winding number rule is used. In this table, the vector value is additionally contained.

Let us consider the vertex A. The graphic line connected to the vertex A are the graphic lines 40 and 44. Accordingly, line tables of the graphic lines 40 and 44 are formed.

When the graphic line terminates at the vertex, the line table of the terminated graphic line is removed. For example, when the scan line is moved downward to the vertex D, the graphic line 42 (C–D) terminates here, and therefore, the line table of this graphic line is removed.

After the line tables are formed, a list of the intersections of the graphic lines in those line tables is formed. An example of the intersection list is shown in FIG. 5. This intersection list is formed when the scan line is moved down to the vertex C.

When the scan line reaches the vertex C, line tables of the graphic lines 41 and 42 are formed anew. The intersections P, Q, and T of them and the graphic lines 40 and 44, which correspond to the line tables already formed, are listed up.

The graphic line 41 crosses the graphic line 43 at the intersection S. In the stage where the scan line is moved down to the vertex C, a line table of the graphic line 43 is not yet formed. Therefore, the intersection S is not recognized as an intersection.

After the line tables and the intersection lists are formed, a sorting list is formed. When the scan progresses from left to right, the scan line meets graphic lines. In the sorting list, the line numbers of those graphic lines are listed in the order of its meeting. (Step 7)

Figures 6, 7A, 7B, 7C:
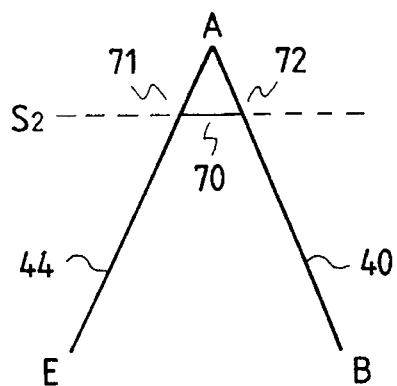
FIG. 6 is a diagram for explaining a fill list.
FIGS. 7A to 7C are examples of sorting lists.
Figure 11A:
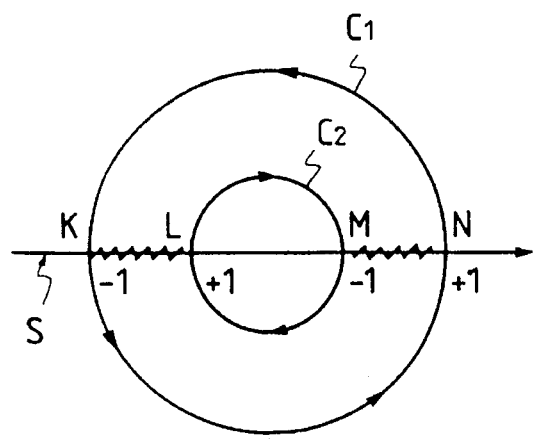
FIGS. 11A and 11B are diagrams for explaining the non-zero winding number rule.
Figure 11B:
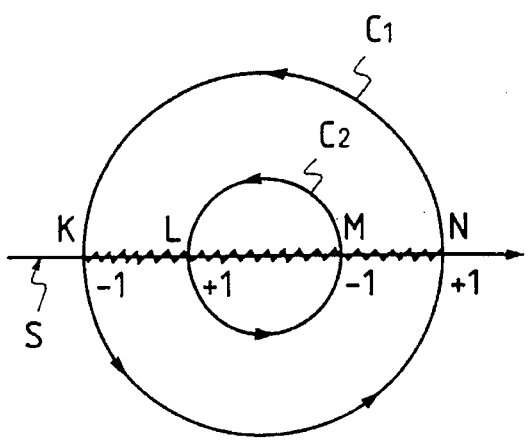

FIGS. 7A to 7C show examples of the sorting table. FIG. 7A shows a sorting list formed at the vertex A. When the graphic line 44 is compared with the graphic line 40, the vertex A is common to both lines. The X coordinates of the vertexes E and B show that the graphic line 44 is located to the left (it first meets the scan line). Accordingly, the sorting list formed is as shown in FIG. 7A. The sorting list is continuously valid during the period of scan from the vertex A to the vertex C.

FIG. 7B shows a sorting list formed at the vertex C. At the vertex C, the scan line meets the graphic lines 41 and 42, in addition to the graphic lines 40 and 44. Those graphic lines 41, 42, 44, and 40 are present in this order when viewed from left to right. Therefore, those are also sorted in this order.

FIG. 7C shows a sorting list formed at the intersection P. At the intersection P, the graphic lines 44 and 42 are positionally interchanged, and hence those are also reversed in the sorting list (compare with FIG. 7B). The sorting lists at other vertexes and intersections may be formed in similar ways.

Then, a fill list, which lists up the paint-out segments on the basis of the sorting list formed as described above, is formed. The paint-out segments are determined depending on the paint-out rule, the odd/even rule or the nonzero winding number rule.

FIGS. 8A to 8C show examples of fill lists. As shown, the right and left ends of the painted-out segment extending along the scan line are listed in the fill list. FIG. 8A shows a fill list formed at the vertex A. FIGS. 8B and 8C show fill lists prepared at the vertex C and the intersection P.

FIG. 6 is a diagram for explaining the fill list of FIG. 8A. When the scan line is present at position S2 between the vertex A and the next vertex C, the left end of the paint-out segment 70 lies at point 71 on the graphic line 44, while the right end, at point 72 on the graphic line 40.

It is checked whether the scan line has been moved down to the last position (the lowest vertex) where all the scans are completed. (Step 8) If it reaches the lowest vertex, process goes to END. If not, control returns to step S2. In step 4, the scan line was moved down by one step. The vertex detected when control returns to step 2 is the vertex C in the case of FIG. 2.

The segment is painted out according to the fill list. (Step 9)

After the paint-out operation for one scan line is completed, the X coordinate values in each line table are updated. (Step 10) A new X coordinate value may be obtained in a manner that the product of multiplying the reciprocal (dX) of the inclination of each line table by the scan line interval is added to the old X coordinate value (Xn). This is done in preparation for the next scan.

The scan line is moved downward by one step. (Step 11) Thereafter, control returns to step 3. While the scan line does not reach the next vertex or intersection yet, control circulates in the loop of steps 3→9→10→11→3 to progressively paint out the segments.

In the paint-out method of the preferred embodiment of the invention, only when the scan line reaches the vertex or intersection of the graphic line, the graphic lines are sorted to form sorting lists. The paint-out operation is performed according to a fill list, which is formed on the basis of the sorting lists.

In the conventional paint-out method, the intersections of the scan line and the graphic lines must be sorted every scan line (those are arranged in order from the smallest X coordinate value). On the other hand, in the paint-out method of the present invention, only when the scan line reaches the vertex or intersection of the graphic line, the graphic lines are sorted to form sorting lists. Accordingly, the time for the sorting is remarkably saved, and hence the paint-out processing may be performed at a high speed.

What is claimed is:

1. In a system including a memory means, a method of painting a graphic figure to be displayed by a graphics apparatus, the method comprising the steps, performed by a processor, of:

extracting a list of vertices from a figure having multiple graphic lines;

moving a scan line in a direction of a first coordinate;

generating line tables containing attributes of respective graphic lines;

generating, in accordance with the line tables, an intersection list containing coordinates representing intersections of the graphic lines;

writing attribute information, in accordance with the list of vertices, for a graphic line into the memory means when a position of the scan line intersects the graphic line and a previous position of the scan line did not intersect the graphic line;

erasing attribute information for the graphic line from the memory means when the scan line does not intersect the corresponding graphic line;

generating a sorted list corresponding to the contents of the memory means when the scan line intersects an intersection of graphic lines, in accordance with the intersection list; and finding, responsive to the sorted list, a region to be painted by processing the graphic figure in a direction of the scan line.

2. A system for painting a graphic figure to be displayed by a graphics apparatus, the system comprising:

memory means;

means for extracting a list of vertices from a figure having multiple graphic lines;

means for generating an intersection list containing coordinates representing intersections of the graphic lines;

means for moving a scan line in a direction of a first coordinate;

means, responsive to the extracting means, for writing attribute information for a graphic line into the memory means;

means, responsive to the intersection list generating means, for generating a sorted list corresponding to the contents of the memory means when the scan line intersects an intersection of graphic lines; and means for finding, responsive to the sorted list, a region to be painted by processing the graphic figure in a direction of the scan line.

3. A system as claimed in claim 2, wherein said first coordinate is Y coordinate.

4. The system according to claim 2, further comprising means for generating a table corresponding to the painted region.

5. A system for painting a graphic figure to be displayed by a graphic apparatus, the system comprising:

memory means;

means for extracting a list of vertices from a figure having multiple graphic lines;

means for generating line tables containing attributes of respective graphic lines and for storing the line tables into the memory means;

means for moving a scan line in a direction of a first coordinate;

means, responsive to the extracting means, for writing attribute information for a graphic line into the memory means when the scan line intersects the graphic line and a previous position of the scan line did not intersect the graphic line; means for generating a line intersection list, responsive to the contents of the memory means, and for storing the line intersection list in the memory means;

means for generating a sorted list corresponding to the contents of the memory means when the scan line intersects an intersection of graphic lines; and means for finding, responsive to the sorted list, a region to be painted by processing the graphic figure in a direction of the scan line.

6. A system as claimed in claim 5, wherein said first coordinate is Y coordinate.

7. The system according to claim 5, further comprising means for generating a table corresponding to the painted region.

8. A system for painting a graphic figure to be displayed by a graphic apparatus, the system comprising:

memory means;

means for extracting a list of vertices from a figure having multiple graphic lines;

means for generating line tables containing attributes of respective graphic lines;

means, responsive to the line tables generating means, for generating an intersection list containing coordinates representing intersections of the graphic lines and storing the intersection list in the memory means;

means for moving a scan line in a direction of a first coordinate;

means, responsive to the extracting means, for writing attribute information for a graphic line into a memory means when the scan line intersects the graphic line and a previous position of the scan line did not intersect the graphic line;

means for erasing information corresponding to the graphic line from the memory means when the scan line does not intersect the corresponding graphic line;

means for generating a sorted list corresponding to the contents of the memory means when the scan line intersects an intersection of graphic lines; and means for finding, responsive to the sorted list, a region to be painted by processing the graphic figure in a direction of the scan line.

9. A system for painting a graphic figure to be displayed by a graphics processing apparatus, the system comprising:

means for extracting vertices of the graphic figure from contour information of the graphic figure and arranging the vertices in the order of a coordinate;

means for generating a vertex table containing attributes of respective verticies;

means for moving a scan line in a direction of the coordinate;

means for determining attributes of a graphic line from the contour information and the vertex list when the scan line intersects a vertex of the graphic figure, the vertex being defined by the graphic line; and means for finding a region to be painted on the basis of determine attributes of the graphic line.

10. A system for painting a graphic figure to be displayed by a graphics processing apparatus, the system comprising:

means for extracting vertices of the graphic figure from contour information of the graphic figure and arranging the vertices in the order of a coordinate;

means for generating an intersection list containing attributes of respective intersections and verticies of graphic lines of the graphic figure;

means for moving a scan line in a direction of the coordinate;

means for determining attributes of a graphic line from the contour information and the intersection list when the scan line intersects a vertex of the graphic figure, the vertex being defined by the graphic line;

means for determining attributes of a graphic line defining an intersection from the contour information of the graphic figure and the intersection list when said scan line intersects the intersection; and means for finding a region to be painted in accordance with attributes of the graphic line defining said vertex and the attributes of the graphic line defining the intersection.

11. In a system including an image supply apparatus having a bit map memory and a graphic pattern memory, a method of painting a graphic figure to be displayed by a graphics apparatus, the method comprising the steps, performed by a processor, of:

reading contour information from the graphic pattern memory and contour information to arrange extracting vertices of the graphic figure from the vertices in the order of a coordinate;

moving a scan line in a direction of the coordinate;

generating a vertex list containing attributes of verticies defined by graphic lines of the graphic figure;

determining attributes of a graphic line the contour information from the vertex list when the scan line intersects a vertex of the graphics figure, the vertex being defined by the graphics line;

generating a signal representing a painted figure in accordance with the attributes of the graphic line; and writing the signal into the bit map memory.

* * * * *

UNITED STATES PATENT AND TRADEMARK OFFICE
CERTIFICATE OF CORRECTION

PATENT NO. : 5,579,460
DATED : November 26, 1996
INVENTOR(S) : Hiroshi SHINNAI

It is certified that error appears in the above-indentified patent and that said Letters Patent is hereby corrected as shown below:

Claim 9, column 8, line 30, "verticies" should read --vertices--.

Claim 10, column 8, line 46, "verticies" should read --vertices--.

Signed and Sealed this

Eighth Day of July, 1997

Attest:

Attesting Officer

BRUCE LEHMAN

Commissioner of Patents and Trademarks